United States Patent [19]

Edwards

[11] Patent Number: 5,766,106
[45] Date of Patent: Jun. 16, 1998

[54] CRANKSET ASSEMBLY

[76] Inventor: Craig H. Edwards, 3460 Ocean View Blvd., Suite D, Glendale, Calif. 91208

[21] Appl. No.: 525,237

[22] Filed: Sep. 8, 1995

[51] Int. Cl.$^6$ ............................................. F16H 55/12
[52] U.S. Cl. ......................................... 474/160; 474/164
[58] Field of Search ............................. 474/164, 160; 74/594.1, 594.2, 594.3; 280/259, 260

[56] References Cited

U.S. PATENT DOCUMENTS

| | | | |
|---|---|---|---|
| 4,259,880 | 4/1981 | Ueno | 74/594.2 |
| 4,642,075 | 2/1987 | Nagashima | 474/164 |
| 4,741,724 | 5/1988 | Wang | 474/164 |
| 5,133,695 | 7/1992 | Kobayashi | 474/164 |
| 5,426,997 | 6/1995 | Brion | 74/594.1 |

*Primary Examiner*—Roger J. Schoeppel
*Attorney, Agent, or Firm*—Ladas & Parry

[57] ABSTRACT

A crankset assembly employing a steel spider construction without adding excessive weight, and accommodating virtually unlimited combinations of bolt circle diameters and types of chain rings that include the crankset assembly. The crankset assembly may include a crank arm, a spindle piece attached to the crank arm, a radially extending spider fixed to the crankset assembly, at least two chain rings supported on the crankset assembly by the spider, and a plurality of connector elements attached to the spider at a corresponding plurality of spaced positions about the spider central axis. At least one of the chain rings is mounted to, and solely supported by, the plurality of connector elements.

17 Claims, 3 Drawing Sheets

CRANKSET ASSEMBLY

BACKGROUND OF THE INVENTION

1. Field of the Invention

This invention relates to crankset assemblies for lightweight vehicles, such as a bicycle. The invention relates to an improved construction of such crankset assemblies.

2. Brief Description of the Prior Art

Crankset assemblies of a large variety of different types of constructions have been known for many years. However, most crankset construction designs mount each chain ring (usually three) onto a spider which is integral with the crank arm of the crankset. That is, each chain ring is mounted directly and independently on a spider which may be mounted on, or integral with, a crank arm. Although some prior art crankset assemblies may use a common bolt to mount, for example, the medium and large diameter chain rings to the spider, nevertheless each chain ring of the set is directly and physically attached to the same spider member. Because of this construction, the spider must extend radially sufficiently to accommodate all the chain ring mounting bolts, resulting in a heavier spider portion of the crankset assembly. This is a big disadvantage in the professional line of bicycles, since professional bike riders go to extremes to lessen the weight of the bicycle for handling and speed advantages.

Prior art crankset assemblies that mount all of the chain rings to the integral spider are quite expensive, since the configuration of the spider must provide three separate mounting planes, perpendicular to the axis of the spindle, in order to bolt onto the spider the three chain rings. Since making such a three-level mounting structure, for the three chain rings, out of steel would make the spider portion of the assembly too heavy, most spider members are made of aluminum, but the high manufacturing cost for creating such a complicated spider assembly still remains.

Another disadvantage of the prior art crankset assemblies is that, since a common spider is constructed to receive each chain ring mounted to the spider by, typically, ten chain ring bolts, the tolerance on the placement of the internally tapped or drilled holes in the chain rings must be precise. Slight deviations of alignment due to tolerance limitations in the manufacturing process can make assembly very difficult or impossible. This extremely light tolerance requirement by the prior art additionally adds to the cost of the crankset assembly.

Yet another disadvantage of the prior art crankset assemblies is related to the fact that each spider is designed with predetermined chain ring bolt circles (the circle defined by holes in the chain rings through which the chain ring bolts are inserted) of predetermined size. Since there are a variety of chain ring types available to the consumer, dependent upon where the consumer wishes to ride the bicycle and what type of terrain he or she will be traversing, and since different riders may wish to have different sizes of chain rings for the small, medium, and large diameter chain rings of the set, in order to accommodate all of the desired riding preferences of the ultimate purchaser, a manufacturer would have to produce and stock a very large number of crankset arm/spider parts. For example, on mountain bikes, there are commonly two sizes of chain ring bolt diameters requiring the provision in the spider and chain rings of either small bolt circles or big bolt circles. Additionally, there are a variety of chain rings which give the rider the choice of different gear ratios by the provision of more or less teeth on the chain ring. Generally, the larger diameter chain rings with more teeth require a big bolt circle for mounting, while the smaller chain rings are mounted using small bolt circles. All of these separate requirements and desires on the part of the individual bike rider make it practically impossible for a manufacturer to provide all possible combinations of small and large bolt circles, and small and large diameter chain rings.

SUMMARY OF THE INVENTION

The present invention solves all of the above-stated problems of the prior art by providing a crankset assembly that can use a steel spider construction without adding excessive weight, and that can accommodate virtually unlimited combinations of bolt circle diameters and types of chain rings that comprise the crankset assembly.

In accordance with one aspect of the invention, the crankset assembly comprises a crank arm, a spindle piece attached to the crank arm, a radially extending spider fixed to the spindle piece, and at least two chain rings, the smallest diameter chain ring being mounted to the spider by a plurality of chain ring bolts, and wherein all of the chain rings are supported by the spider by means of the small chain ring bolts.

In another aspect of the invention, the crankset assembly comprises a crank arm, a spindle piece attached to the crank arm, a radially extending spider fixed to the spindle piece, at least two chain rings supported on the crankset assembly by the spider, and a plurality of connector elements attached to the spider at a corresponding plurality of spaced positions about the spider central axis. At least one of the chain rings is mounted to, and solely supported by, the plurality of connector elements.

The spider is preferably formed of a flat weldable metal, such as steel, and need only extend out to the small chain ring bolts. The connector elements connect the outer two chain rings, in a typical arrangement, one on either side of the connector element, and this subassembly, of connector elements and medium and large diameter chain rings, is mounted to the spider by means of the common bolts that attach the small chain ring to the spider.

Of significance is the fact that the crank arm and spindle may be made of steel to provide high strength and rigidity to the crankset assembly. Being made of steel, the spider can also be welded to the spindle. The chain rings, which are typically and desirably made of aluminum, may then be readily and securely attached to the spider by means of the aforedescribed connector elements. The connector elements thus provide a mechanical transition between dissimilar metals in the construction of a crankset assembly, allowing each part to be formed of the metal which is best suited for its function. The connector elements themselves may be made of aluminum or any other strong and rigid, but lightweight, material. Some modern plastics may, for example, provide the necessary strength and rigidity for this purpose.

In any event, by employing the plurality of connector elements, a variety of other advantages can be appreciated with respect to the prior art. For example, because the connector-element-supported chain rings are not mounted directly to a rigid preformed cast spider, there is some allowable tolerance in constructing the crankset assembly, since the connector elements themselves may be shifted slightly for accurate alignment of the chain ring bolts, and so the crankset assembly according to the present invention can accommodate a higher degree of manufacturing tolerance in the manufacture of each individual part.

Another advantage of using the connector elements according to the present invention is that the relatively small connector elements themselves can very easily and cheaply be formed to have either small or big bolt circles. For example, the small diameter chain ring can use a small bolt circle, while the larger diameter chain rings can be mounted to the connector elements by means of bolts requiring big bolt circles. If desired, a separate set of connector elements can quickly and inexpensively replace those just described so as to accommodate medium and large diameter chain rings having small bolt circles. Although, in order to meet most requirements of bolt circle sizes, a variety of connector elements would be required to be manufactured and stocked, these are very small and inexpensive parts, so that the overall cost of accommodating even a large number of variations of chain ring diameters and thicknesses as well as bolt circle sizes is not prohibitive.

The use of connector elements as presented in this specification also permits the forming of the spider from a flat sheet of material, preferably steel. This is due to the fact that only the small diameter chain ring is mounted directly to the spider on one of its planar surfaces, while the connector element itself which, in turn couples the medium and large diameter chain rings together, is mounted to the spider on the opposite planar surface thereof.

BRIEF DESCRIPTION OF THE DRAWING

The invention will now be described having reference to the accompanying drawings in which.

DETAILED DESCRIPTION OF THE PREFERRED EMBODIMENT

Figures 1, 2:
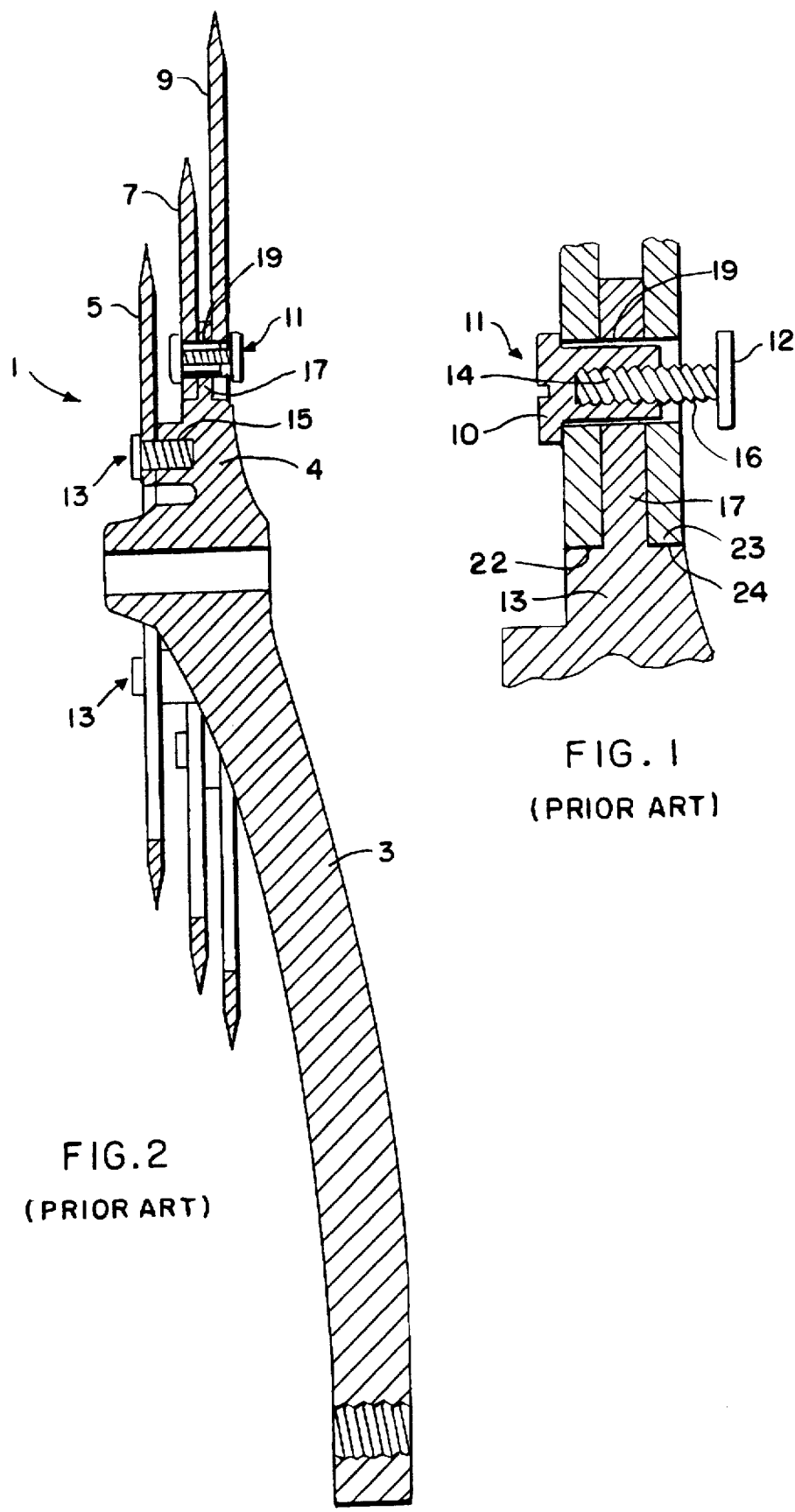
FIG. 1 is a cross sectional view of a prior art integral crank arm/spider member as part of a prior art crankset assembly.
FIG. 2 is a magnified view of a portion of FIG. 1 showing the manner in which a typical prior art chain ring bolt fastener is used.

FIG. 1 shows a typical prior art crankset assembly 1 having an integral crank arm 3 and spider 4. Mounted directly on spider 4 are a small diameter chain ring 5, a medium diameter chain ring 7, and a large diameter chain ring 9. Chain rings 7 and 9 are directly mounted to the spider 4 which has a radially directed thinned projection 17 formed with a hole 19 through which the chain ring fastener, or bolt, 11 may pass.

FIG. 2 is a magnified portion of the chain ring bolt fastener 11 which shows the fastener 11 to comprise an internally threaded sleeve part 10 and an externally threaded bolt part 12. The sleeve part 10 extends into but not through all of the parts to be fastened together and has internally formed threads 14. Typically, the sleeve part 10 is first inserted through the elements to be fastened, and then the bolt 12 with its external threads 16 is screwed into the internally threaded sleeve part 10. Typically, although not shown in the drawing, either the sleeve part 10 or the bolt part 12 are provided with central hexagonal depressions or channels to receive a hex drive tool.

The small chain ring 5, in the prior art assembly of FIG. 1, is mounted directly to the spider 4 by means of a threaded bolt 13 which is screwed into an internally threaded bore 15 of the spider 4. Although the medium and large diameter chain rings 7 and 9 have surfaces 21 and 23, respectively which contact shoulders 22 and 24 of spider 4, the region of contact between surfaces 21 and 23 and shoulders 22 and 24, respectively have no structural significance, since the entire support for the chain rings 7 and 9 onto spider 4 is by means of the chain ring bolt fastener 11 as described earlier. That is, in a typical crankset assembly of this type, so as to not create an unnecessary tolerance condition, there is a small gap between the surfaces 21 and 23 and their respective shoulders 22 and 24, and this is of no consequence, since no contact pressure is ever applied as between these pairs of surfaces.

Figure 3:
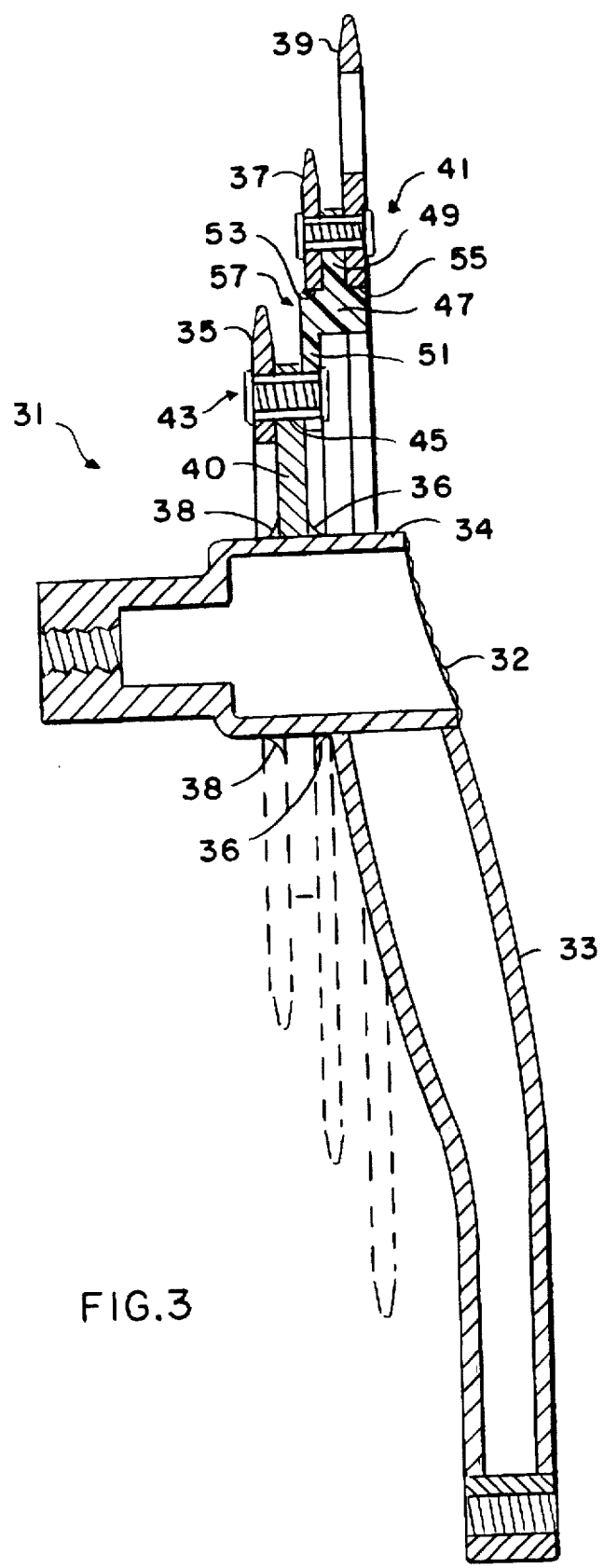
FIG. 3 is a cross sectional view of a crankset assembly constructed in accordance with the present invention.

FIG. 3 is a cross sectional view of the crankset assembly constructed in accordance with the present invention, and it will be noted that crank arm 33 and spindle piece 34 are of very thin material, as they may be constructed of steel and welded together at weld beads 32 and 36. A flat surfaced, preferably planar, spider 40 is also welded to the spindle part 34 as indicated by weld beads 36 and 38. In FIG. 3, only the top portion of the arrangement of chain rings and their mounting details are shown in solid lines for convenience only. Additionally, although not specifically illustrated, it will be understood that, in a typical bicycle crankset assembly construction, the chain rings will be attached to their mounting members at five circumferential positions. In FIG. 3, only a single support connection for each of the three chain rings is illustrated. It is also to be understood that there is no limit to the number of fastening locations, but, again, typically the number of fastener locations is five.

For convenience, spider 40 shown in FIG. 3 is shown cross sectioned as if it were solid. However, as will be seen in FIG. 7, the spider, being made of strong steel, can be formed (e.g. milled) to comprise triangular segments of thin steel elongated elements. How the elongated elements are constructed and formed is not significant, as this would be well within the knowledge and understanding of a person of ordinary skill in the art. Of importance, however, is the fact that spider 40 may be formed from a single flat piece of steel having parallel planar facial surfaces. It is this aspect of the invention which renders the dual advantages of being able to use high strength steel material, and yet avoiding the expensive and heavy weight of a multi-level integral piece for the construction of the spider 40.

Figure 4:
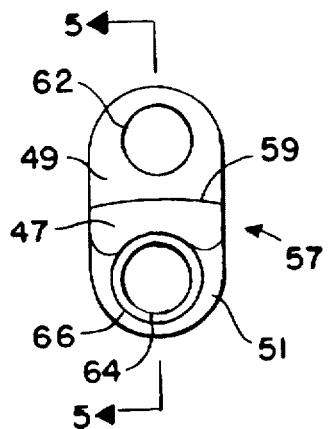
FIG. 4 is a front view of a connector element employed in the present invention to couple the outer two chain rings together and to mount the coupled chain rings to the spider.
Figure 5:
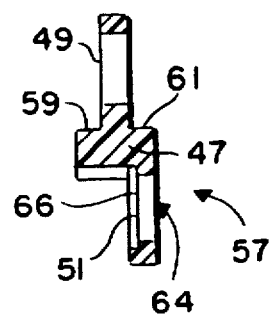
FIG. 5 is a right side cross sectional view of the connector element of FIG. 4.
Figure 6:
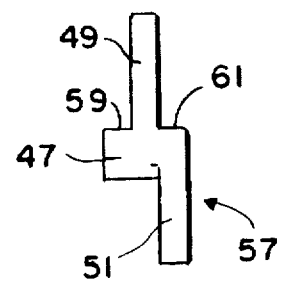
FIG. 6 is a right side elevation view of the connector element of FIG. 4.

Again referencing FIG. 3, a connector element 57 is shown to have a central body portion 47, a radially outwardly directed projection 49, and a radially inwardly directed projection 51. The configuration and function of the connector elements 57 can be best understood by referring to all of FIGS. 3-7 in the further description to follow. In this connection, FIG. 4 shows the front view, as defined herein, of the connector element 57, looking from the crank arm side of the crankset assembly, i.e. from the right side of the crankset assembly shown in FIG. 3. FIG. 5 is a right side cross sectional view of the connector element of FIG. 4, and FIG. 6 is a right side elevation view of the connector element of FIG. 4. In further discussing the connector element 57, the radially inwardly directed projection 51 will be referred to as the lower projection, while the radially outward projection 49 will be referred to as the upper projection, for convenience of discussion.

The small diameter chain ring is shown mounted directly to the spider 40 by a bolt fastener 43 similar to the bolt fastener 11 described in connection with FIGS. 1 and 2. Spider 40 has a hole 45 sized to accommodate the fastener 43 which would typically be a small diameter bolt therefore requiring hole 45 to define a small bolt circle.

In addition to mounting the small diameter chain ring 35 to spider 40, fastener 43 also attaches the lower projection 51 of connector element 57 to spider 40. The hole 64 (see FIG. 4) in connector element 57 is likewise a small bolt circle in size.

The upper projection 49 is thinned from the body portion 47 of connector element 57, thereby defining a pair of shoulders 61 and 59 upon which conforming surfaces of chain rings 37 and 39 sit. A chain ring bolt fastener 41 is shown to connect the medium diameter chain ring 37 and large diameter chain ring 39 to opposite sides of upper projection 49 of the connector element 57.

Unlike the facing surfaces 21 and 23 and shoulders 22 and 24 described in connection with FIG. 2, the inwardly directed surfaces 53 and 55 of chain rings 37 and 39, respectively, and corresponding shoulders 61 and 59 serve a useful purpose in the present invention. Without the surface/shoulder contact between the chain rings and connector elements, there would be a tendency for the outer two chain rings 37 and 39 to cause a pivoting motion of connector element 57 about its chain ring bolt fastener 43. Such undesirable rotation about fastener 43 is eliminated by the resistance to such rotation as the surfaces 53 and 55 are pressed against shoulders 61 and 59, respectively, upon the application of torque by the rider to the chain of the bicycle driving either of chain rings 37 or 39. Moreover, since each chain ring 37 and 39 employs a surface-to-shoulder contact surface, the contact surface between surface 53 and shoulder 61 as well as the contact surface between surface 55 and shoulder 59 will both act to resist rotation about fastener 43 even though torque is being applied to only one of the chain rings. For example, if the chain is driving chain ring 37, in addition to the contact surface 53 and shoulder 61 being mutually engaged to prevent rotation of connector element 57 about fastener 43, the surface contact between surface 55 and shoulder 59 offers additional resistance to such rotation.

As was alluded to earlier in this description, in the event that the user wishes to alter the configuration of the chain ring set 35, 37, 39, e.g. change the bolt circle diameter, this may be easily accommodated by providing, if necessary, a different connector element 57. For example, for a larger bolt circle diameter chain ring for chain rings 37 and 39, a different connector element 57 would be required such that the lower hole 64 would define the same small bolt circle, while the upper hole 62 would define a bigger bolt circle. Representative of this aspect of the invention, the lower hole 64 in FIG. 5 is shown to be of a smaller diameter than the upper hole 62, while in FIG. 4, these two holes 62, 64 are shown to be of the same diameter.

It can also be appreciated from this description that the provision of connector elements 57 permits the changing of material types from the steel spider 40 to the aluminum outer chain rings 37, 39, as previously noted without additional fasteners compared to the conventional crankset.

Figure 7:
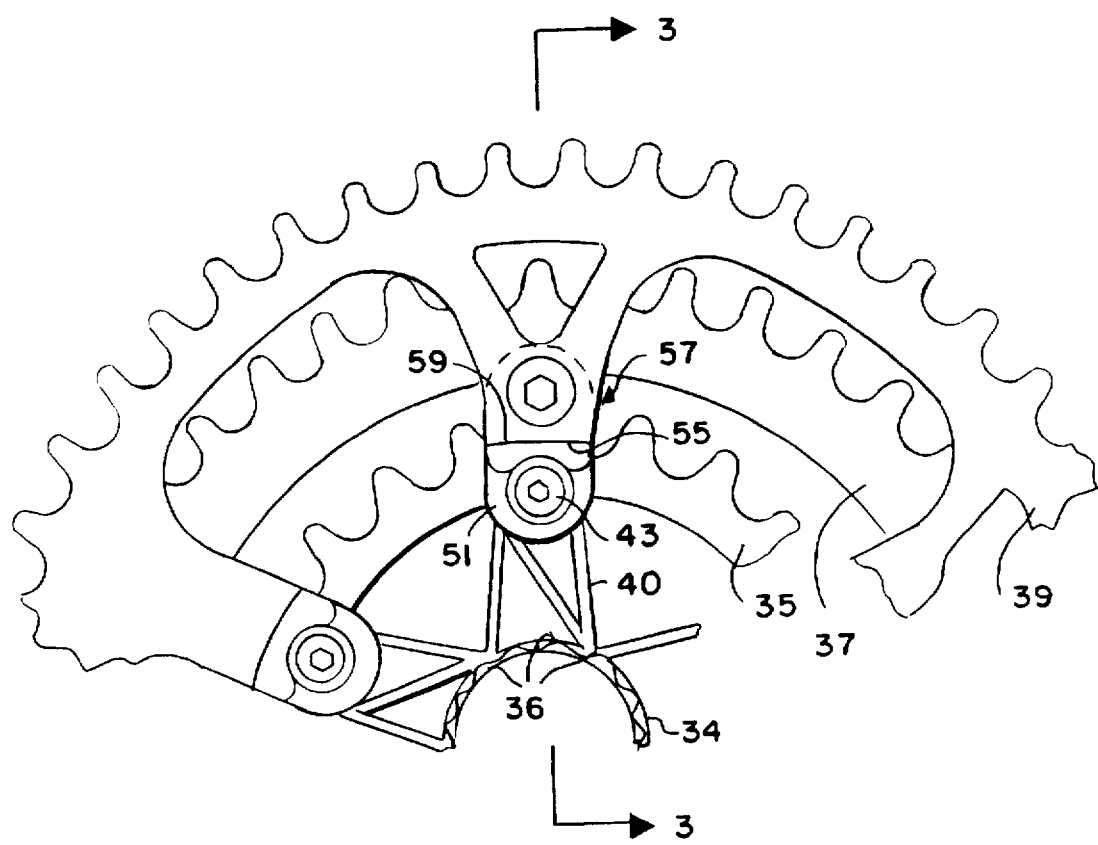
FIG. 7 is a partial front view of a crankset assembly, as viewed from the crank arm side of the assembly shown in FIG. 3, depicting the placement of the various parts of the invention in detail.

For increased strength, the body portion 47 of connector element 57 is thickened as seen in FIGS. 3–7. The scalloped look to the bottom of thickened portion 47 is the result of making the body portion 47 as thick as possible without interfering with the head of the fastener 43 which must be clear to enter hole 64 and fit against seat 66. FIGS. 4 and 7 also illustrate that the surface 55 of large chain ring 39 is curved about the axis of spindle part 34 and has a shape conforming to that of shoulder 59 of connector element 57. Although not shown, the corresponding surface 53 of chain ring 37 and shoulder 61 of connector element 57 are also similarly configured. It will be understood, however, that there is no restriction on the shape of the contacting surfaces, provided such contacting surfaces act to restrain pivoting about ring bolt 43.

While certain novel features of this invention have been shown and described and are recited in the appended claims, the invention is not intended to be limited to the embodiments detailed above. For example, the number of chain rings, the number of fastener attachment points, the choice of materials, the physical appearance of the connector elements 57, and the type of fastener means are all subject to design modifications at the whim of the designer. Such alteration of the disclosed preferred embodiment is sufficiently self-evident that further description on details of such alternative construction need not be presented in this disclosure. It is also to be understood that the concepts presented by the representative embodiment of the invention can be adapted for use with other than bicycle applications. Finally, it will be understood that various omissions, modifications, substitutions, and changes in the forms and details of the device illustrated, and in its operation, can be made by those in the art without departing in any way from the spirit and scope of the present invention.

I claim:

1. A crankset assembly comprising:

a crank arm;

a spindle piece attached to said crank arm, said spindle piece having a central axis;

a radially extending spider fixed on said assembly, said spider having a central axis common with said spindle piece axis;

at least two chain rings supported on said crankset assembly by said spider; and a plurality of replaceable connector elements attached to said spider at a corresponding plurality of spaced positions about said spider central axis;

at least one of said chain rings being mounted to and solely supported by said plurality of replaceable connector elements;

wherein each said connector element comprises an axially extending shoulder; and said at least one chain ring mounted to and solely supported by said plurality of connector elements comprises an axially extending surface adjacent each said spaced position about said spider central axis, each said axially extending surface paralleling and surface contacting one of said shoulders, whereby the tendency to rotate said connector elements about said positions of attachment to said spider, when said at least one chain ring is torqued, is resisted by said connector element shoulders.

2. A crankset assembly comprising:

a crank arm;

a spindle piece attached to said crank arm, said spindle piece having a central axis;

a radially extending spider fixed on said assembly, said spider having a central axis common with said spindle piece axis;

at least two chain rings supported on said crankset assembly by said spider; and a plurality of replaceable connector elements attached to said spider at a corresponding plurality of spaced positions about said spider central axis;

at least one of said chain rings being mounted to and solely supported by said plurality of replaceable connector elements;

wherein the number of chain rings is two, comprising a first chain ring and a second chain ring;

said first and second chain rings are both mounted to and solely supported by said plurality of connector elements.

3. The crankset assembly as claimed in claim 2, further including a small diameter chain ring, said first and second chain rings defining, respectively, medium and large diameter chain rings;

said small diameter chain ring being mounted to and solely supported by said spider.

4. The crankset assembly as claimed in claim 3, comprising a plurality of fasteners for mounting said small diameter chain ring to said spider, mounting said connector elements to said spider, and connecting said medium and large diameter chain rings to said connector elements; and wherein said small diameter chain ring and said plurality of connector elements share common fasteners for attachment to said spider.

5. The crankset assembly as claimed in claim 2, including a small diameter chain ring, said first and second chain rings defining, respectively, a medium diameter chain ring and a large diameter chain ring; and wherein:

each said connector element comprises first and second axially extending shoulders; and said medium and large diameter chain rings each comprise an axially extending surface adjacent each said spaced position about said spider central axis, each said axially extending surface of said medium diameter chain ring paralleling and surface contacting one of said first shoulders, and each axially extending surface of said large diameter chain ring paralleling and surface contacting one of said second shoulders, whereby the tendency to rotate said connector elements about said positions of attachment to said spider, when either one of said medium and large diameter chain rings is torqued, is resisted by both said first and second connector element shoulders.

6. A crankset assembly comprising:

a crank arm;

a spindle piece attached to said crank arm, said spindle piece having a central axis;

a radially extending spider fixed to said spindle piece, said spider having a central axis common with said spindle piece axis;

a small, a medium, and a large diameter chain ring, said chain rings spaced axially of said spider, the smallest diameter chain ring being mounted to said spider by a plurality of small chain ring bolts; and a plurality of connector elements on which are mounted all said chain rings except said smallest diameter chain ring, said connector elements being attached to said spider by said small chain ring bolts, and wherein each said connector element has first and second spaced holes therein, said first hole receiving one of said small chain ring bolts for mounting said connector element to said spider, said second hole receiving a ring bolt which mounts said medium and large diameter chain rings to said connector element.

7. The crankset assembly as claimed in claim 6 wherein:

said spider comprises a flat structure having planar facial surfaces and is made of weldable material; and said spider is welded onto said spindle piece.

8. The crankset assembly as claimed in claim 6, wherein said first and second holes are of the same diameter.

9. The crankset assembly as claimed in claim 6, wherein said first and second holes are of different diameters.

10. A crankset assembly comprising: a crank arm;

a spindle piece attached to said crank arm, said spindle piece having a central axis;

a radially extending spider fixed on said assembly, said spider having a central axis common with said spindle piece axis; and at least two chain rings spaced axially of said spider, one of said chain rings being mounted to said spider by a plurality of small chain ring bolts; and wherein all of said chain rings are supported by said spider by means of said small chain ring bolts;

wherein the number of chain rings is three, defining a small, a medium, and a large diameter chain ring; and each said connector element has first and second spaced holes therein, said first hole receiving one of said small chain ring bolts for mounting said connector element to said spider, said second hole receiving a ring bolt which mounts said medium and large diameter chain rings to said connector element.

11. The crankset assembly as claimed in claim 10, wherein said first and second holes are of the same diameter.

12. The crankset assembly as claimed in claim 10, wherein said first and second holes are of different diameters.

13. A crankset assembly comprising:

a crank arm;

a spindle piece attached to said crank arm, said spindle piece having a central axis;

a radially extending spider fixed to said spindle piece, said spider having a central axis common with said spindle piece axis;

a plurality of connector elements attached to said spider at a corresponding plurality of spaced positions about said spider central axis; and first and second chain rings mounted to and solely supported by said plurality of connector elements.

14. The crankset assembly as claimed in claim 13, comprising a third chain ring smaller in diameter than said first and second chain rings, said third chain ring being mounted to and solely supported by said spider.

15. The crankset assembly as claimed in claim 14, comprising a plurality of fasteners for mounting said third chain ring to said spider, mounting said connector elements to said spider, and attaching said first and second diameter chain rings to said connector elements, and wherein said third chain ring and said plurality of connector elements share common fasteners for attachment to said spider.

16. The crankset assembly as claimed in claim 13, wherein: each said connector element comprises an axially extending shoulder; and said first and second chain rings each comprise an axially extending surface adjacent each said spaced position about said spider central axis, each said axially extending surface paralleling and surface contacting one of said shoulders, whereby the tendency to rotate said connector elements about said positions of attachment to said spider, when said at least one chain ring is torqued, is resisted by said connector element shoulders.

17. A crankset assembly comprising:

a crank arm;

a spindle piece attached to said crank arm, said spindle piece having a central axis;

a radially extending spider fixed on said assembly, said spider having a central axis common with said spindle piece axis; and at least two chain rings spaced axially of said spider, one of said chain rings being mounted to said spider by a plurality of small chain ring bolts; and wherein all of said chain rings are supported by said spider by means of said small chain ring bolts;

wherein said spider comprises a flat structure having planar facial surfaces and is made of weldable material; and said spider is welded onto one of said spindle piece and said crank arm.

* * * * *